US 6,671,735 B1

(12) United States Patent
Bender

(10) Patent No.: US 6,671,735 B1
(45) Date of Patent: Dec. 30, 2003

(54) SYSTEM AND METHOD FOR USING AN IP ADDRESS AS A WIRELESS UNIT IDENTIFIER

(75) Inventor: Paul E. Bender, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/494,204

(22) Filed: Jan. 28, 2000

(51) Int. Cl.⁷ .............................................. G06F 15/173
(52) U.S. Cl. ...................................... 709/238; 370/351
(58) Field of Search ............................... 709/238, 245; 370/338, 356, 351

(56) References Cited

U.S. PATENT DOCUMENTS

| | | | | |
|---|---|---|---|---|
| 5,953,322 A | * | 9/1999 | Kimball | 370/328 |
| 6,061,341 A | * | 5/2000 | Andersson et al. | 370/338 |
| 6,151,319 A | * | 11/2000 | Dommety et al. | 370/395.52 |
| 6,154,461 A | * | 11/2000 | Sturniolo et al. | 370/352 |
| 6,167,040 A | * | 12/2000 | Haeggstrom | 370/352 |
| 6,233,608 B1 | * | 5/2001 | Laursen et al. | 709/217 |
| 6,236,653 B1 | * | 5/2001 | Dalton et al. | 370/352 |
| 6,252,952 B1 | * | 6/2001 | Kung et al. | 379/114.1 |
| 6,308,273 B1 | * | 10/2001 | Goertzel et al. | 713/201 |
| 6,314,108 B1 | * | 11/2001 | Ramasubramani et al. | 370/465 |
| 6,373,930 B1 | * | 4/2002 | McConnell et al. | 379/114.28 |
| 6,374,108 B1 | * | 4/2002 | Jakobsen et al. | 455/432.1 |
| 6,449,269 B1 | * | 9/2002 | Edholm | 370/352 |
| 6,457,039 B1 | * | 9/2002 | Fogelholm et al. | 709/200 |
| 6,487,406 B1 | * | 11/2002 | Chang et al. | 455/422.1 |
| 6,487,605 B1 | * | 11/2002 | Leung | 709/245 |
| 2001/0012282 A1 | * | 8/2001 | Yegoshin | 370/338 |
| 2001/0038626 A1 | * | 11/2001 | Dynarski et al. | 370/356 |
| 2002/0105934 A1 | * | 8/2002 | Lee et al. | 370/338 |
| 2002/0161927 A1 | * | 10/2002 | Inoue et al. | 709/245 |

FOREIGN PATENT DOCUMENTS

| | | | | |
|---|---|---|---|---|
| DE | 1 014 628 A1 | * | 6/2000 | ............ H04L/7/26 |
| EP | 0938217 A2 | | 8/1999 | |
| EP | 1014628 A1 | | 6/2000 | |
| JP | WO99/59301 | * | 11/1999 | ........... H04L/12/56 |
| US | WO 0024166 | * | 4/2000 | ........... H04L/12/66 |
| WO | 00/41376 | | 7/2000 | |

OTHER PUBLICATIONS

Lee et al., "The Next Generation of the Internet: Aspect of the Internet Protocol Version 6" IEEE, Jan. 1998, pp. 28–33.*
Danny Cohen et al., "IP Addressing and Routing in a Local Wireless Network," Florence, May 4–8, 1992, New York, IEEE, US, vol. Conf. 11, 1992 (pp. 626–632).

* cited by examiner

*Primary Examiner*—Bunjob Jaroenchonwanit
(74) *Attorney, Agent, or Firm*—Philip Wadsworth; Kent Baker; Sandra L. Godsey

(57) ABSTRACT

A first network access point receives a first wireless link message from a first user terminal. The first wireless link message identifies the first user terminal. The first network access point or other system entity assigns an IP address to the first user terminal for use as a temporary mobile station identifier. The first network access point or other system entity installs a route for the IP address to a controller. The first network access point forwards a wireless link message to the user terminal specifying the IP address. The first or a second network access point receives another wireless link message from the first user terminal in which the first user terminal is identified with the IP address. The first or second network access point parses the message to determine the IP address and creates at least one standard IP packet designating the IP address specified in the message. The first or second network access point forwards the message to a router which routes the packet according to the IP address.

6 Claims, 3 Drawing Sheets

SYSTEM AND METHOD FOR USING AN IP ADDRESS AS A WIRELESS UNIT IDENTIFIER

BACKGROUND OF THE INVENTION

I. Field of the Invention

The invention relates to wireless communication systems. More particularly, the invention relates to wireless networks.

II. Description of the Related Art

Data networks which provide wired connectivity to a set of users are a vital part of the business, academic and consumer environment today. For example, one of the largest data networks in the world is the Internet. In addition to the Internet, many organizations have private networks to which access is limited to a select number of users. For example, a corporation may have an internal data network which interconnects its computers, servers, dumb terminals, printers, inventories and test equipment using a wired Ethernet topology.

When a system user leaves his desk, he often does not wish to lose his connection to the data network. If the user attends a meeting within his organization, he may wish to bring his computer and print out documents on a local printer. He may also wish to maintain connectivity to the data network while moving between his office and the meeting so that he may, for example, continue to download or print a large file, maintain contact with colleagues, or simply avoid re-initiating the connection when he reaches his final destination. All of the functions can be supported through the use of a distributed wireless data network.

FIG. 1 is a block diagram of a distributed wireless data network architecture. In FIG. 1, a series of network access points 12A–12N are distributed throughout a service area. In a typical configuration, each network access point 12 has one or more antennas which provide a corresponding coverage area which abuts one or more coverage areas of other network access points 12 so as to provide a contiguous service area. In the configuration shown in FIG. 1, the network access points 12A–12N may provide continuous coverage for a campus of buildings occupied by a single entity.

In the distributed architecture of FIG. 1, each of the network access points 12A–12N is a peer to the others and no single network access point 12 is designated as a general controller. The network access points 12A–12N are interconnected by a packet router 14. The packet router 14 also interconnects the network access points 12A–12N to an external packet switched network 16 which may be another private network or public network such as the Internet. The packet router 14 can be an off-the-shelf product which operates according to an industry standard protocol suite. For example, the packet router 14 may be a CISCO 4700 packet router marketed by Cisco Systems, Inc. of San Jose, Calif., USA. The industry standard packet router 14 operates according to the Internet protocol (IP) suite. In such a configuration, individual entities within each network access point 12 are assigned a unique IP address and, when an entity within a network access point 12 wishes to communicate with another entity within the other network access points 12A–12N or with an entity coupled to the packet switched network 16, it passes an IP packet to the packet router 14 designating the destination IP address. In addition to the network access points 12A–12N, other entities may be directly wired to the packet router 14 such as printers, computers, test equipment, servers, dumb terminals or any other manner of equipment with data capabilities. These devices are also assigned IP addresses.

Each network access point 12 comprises one or more landside wireless modems which may provide communication with a user terminal 18. Each user terminal 18 comprises a remote unit wireless modem. For discussion purposes, we assume that the wireless modems within the network access points 12A–12N and user terminal 18 provide a physical layer in accordance with the modulation and multiple access techniques described in the TIA/EIA Interim Standard entitled "Mobile Station—Base Station Compatibility Standard for Dual-Mode Wideband Spread Spectrum Cellular System," TIA/EIA/IS-95, and its progeny (collectively referred to here in as IS-95), the contents of which are also incorporated herein by reference or similar subsequent standard. However, the general principles can be applied to many wireless data systems which provide a physical layer interface capable of true mobility.

In FIG. 1, each network access point 12 is coupled with control point capabilities. The control point functionality provides mobility management to the system. The control point functionality executes a plurality of functions such as management of the radio link layer, the signaling protocol and data link layer over the wireless link.

In a typical data system, when a user terminal 18 initially establishes communication with the network, it uses a mobile station identifier (MSID). In one embodiment, the user terminal 18 determines the MSID based upon the network access point's electronic serial number or the mobile identification number or other permanent address associated with the user terminal 18. Alternatively, for increased privacy, the user terminal 18 may select a random number. The user terminal 18 sends an access message to the network access point 12 using the MSID. Using the MSID to identify the user terminal 18, the network access point 12 and user terminal 18 exchange a series of messages to establish a connection. Once an established, encrypted connection is available, the actual mobile station identification can be transferred to the network access point 12 if a random or other nonfully descriptive MSID has been used.

A temporary mobile station identifier (TMSI) can also be use to identify the user terminal 18. The TMSI is considered temporary in that it changes from session to session. A new TMSI may be selected when the user terminal 18 enters another system in which the new network access point is not directly coupled to the originating network access point 12. Also, if power is removed from the user terminal 18 and then reapplied, a new TMSI may be selected.

The originating network access point 12 in which communication is initially established retains in memory the characteristics of the user terminal 18 as well as the current state of the connection. If the user terminal 18 moves to the coverage area of another network access point 12, it uses the TMSI to identify itself to the network access point 12. The new network access point 12 accesses a system memory unit 20 in which the originating network access point 12 is identified as associated with the TMSI. The new network access point 12 receives data packets from the user terminal 18 and forwards them to the indicated originating network access point 12 using the IP address specified in the system memory unit 20.

The process of accessing the system memory unit 20 and managing a centralized pool of TMSIs is cumbersome and consumes system resources. In addition, the process introduces a single point of failure in that a failure of the system memory unit 20 can disable the entire system.

Thus, it will be appreciated that there is a need in the art for a method and system of user terminal identification which is more efficient.

SUMMARY OF THE INVENTION

A first network access point receives a first wireless link message from a first user terminal. The first wireless link message identifies the first user terminal. The first network access point or other system entity assigns an IP address to the first user terminal for use as a temporary mobile station identifier. The first network access point or other system entity installs a route for the IP address to a controller which controls communication with the user terminal. In one embodiment, the controller is within the first network access point. The first network access point forwards a wireless link message to the user terminal specifying the IP address. The first or a second network access point receives another wireless link message from the first user terminal in which the first user terminal is identified with the IP address. The first or second network access point parses the message to determine the IP address and creates at least one standard IP packet designating the IP address specified in the message. The first or second network access point forwards the message to a router which routes the packet according to the IP address.

A system for providing wireless service includes a packet router and a first network access point. The first network access point has a first coverage area. The first network access point is configured to receive wireless link signals from a user terminal within the first coverage area and to establish a route within the packet router for an IP address which corresponds to control functionality within the first network access point. The first network access point is further configured to receive messages from the user terminal identifying itself with the IP address. In one embodiment, the system comprises a second network access point. The second network access point is configured to receive wireless link messages from the user terminal within a second coverage area, to parse the wireless link message to determine the IP address and to create a standard IP packet designating the IP address. The second network access point passes the standard IP packet to the packet router which forwards it according to the established route.

BRIEF DESCRIPTION OF THE DRAWINGS

The features, objectives, and advantages of the invention will become more apparent from the detailed description set forth below when taken in conjunction with the drawings.

DETAILED DESCRIPTION OF THE PREFERRED EMBODIMENTS

Figure 1:
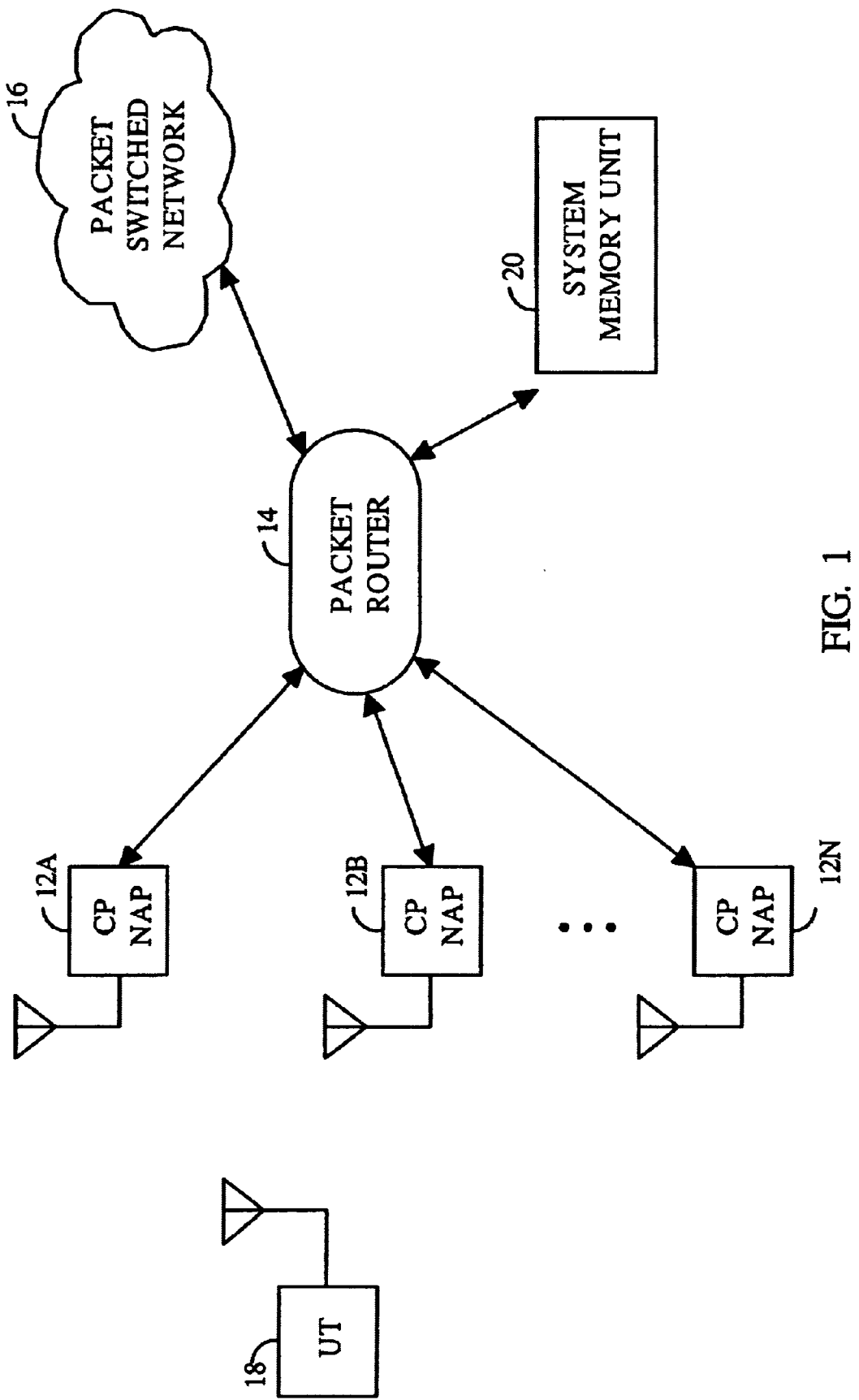
FIG. 1 is a block diagram of a system in which wireless service is provided.
Figure 2:
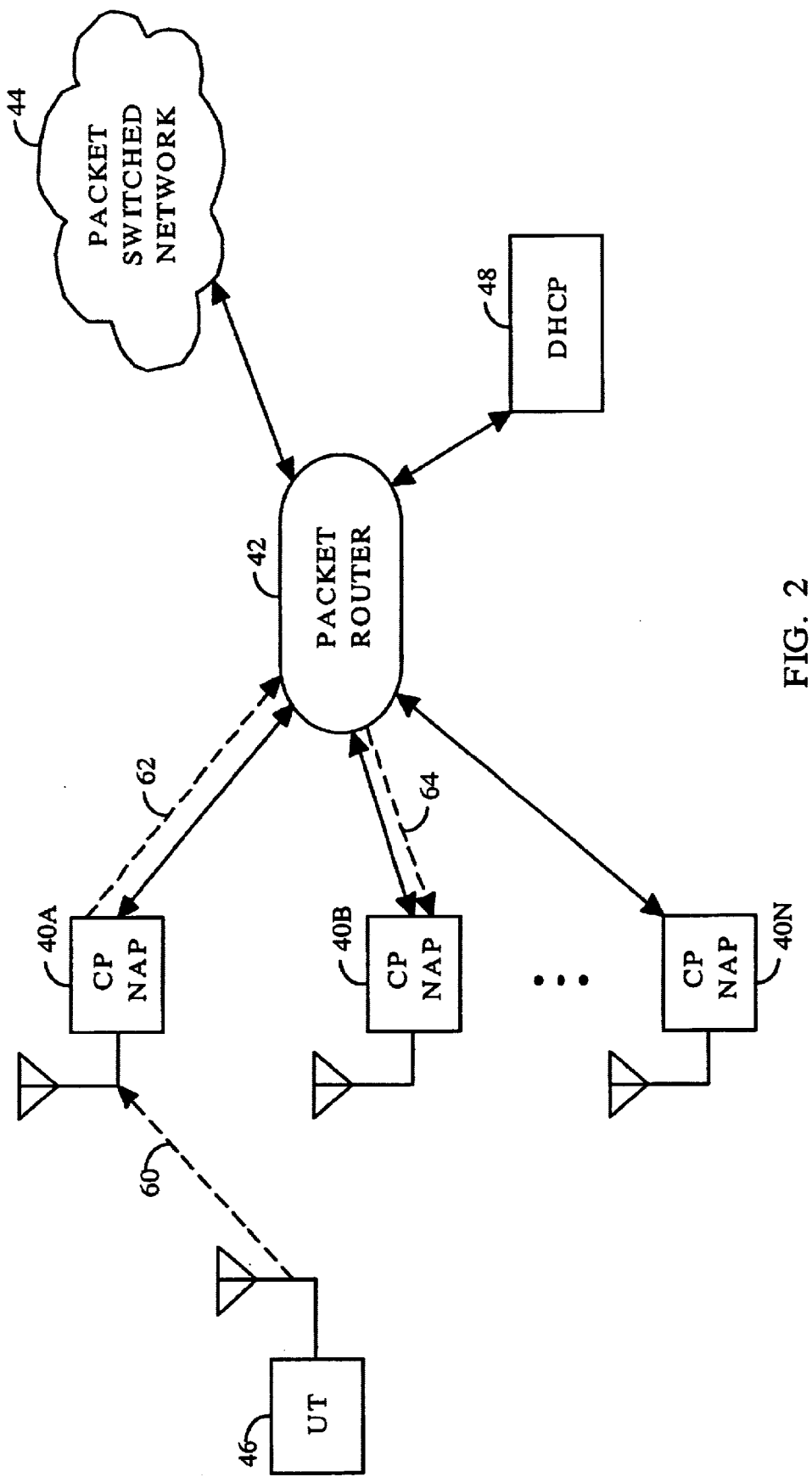
FIG. 2 is a block diagram of a distributed wireless network architecture according to an embodiment of the invention.

FIG. 2 is a block diagram of a distributed wireless data network architecture according to an embodiment. In FIG. 2, a series of network access points 40A–40N are distributed throughout a service area. In a typical configuration, each network access point 40 has one or more antennas which provide a corresponding coverage area which abuts one or more coverage areas of other network access points 40 so as to provide a contiguous service area. In the configuration shown in FIG. 2, the network access points 40A–40N may provide continuous coverage for a campus of buildings occupied by a single entity.

In the distributed architecture of FIG. 2, each of the network access points 40A–40N is a peer to the others and no single network access point 40 is designated as a general controller. The network access points 40A–40N are coupled to a packet router 42 which provides interconnectivity therebetween. The packet router 42 also interconnects the network access points 40A–40N to an external packet switched network 44 which may be another private network or a public network such as the Internet. The packet router 42 can be an off-the-shelf product which operates according to an industry standard protocol suite. For example, the packet router 42 may be a CISCO 4700 packet router marketed by Cisco Systems, Inc. of San Jose, Calif., USA.

The standard packet router 42 operates according to the Internet protocol (IP) suite. In such a configuration, individual entities within each network access point 40 are assigned a unique IP address and, when an entity within a network access point 40 wishes to communicate with another entity within the other network access points 40A–40N or with an entity coupled to the packet switched network 44, it passes an IP packet to the packet router 42 designating the source and destination IP address. In addition to the network access points 40A–40N, other entities may be directly wired to the packet router 42 such as printers, computers, test equipment, servers, dumb terminals or any other manner of equipment with data capabilities. These devices are also assigned IP addresses.

Each network access point 40 comprises one or more landside wireless modems configured to provide communication with a user terminal 46. Each user terminal 46 comprises a remote unit wireless modem which is configured to provide a physical layer for wirelessly coupling the user terminal 46 to the network access points 40.

In FIG. 2, each network access point 40 is coupled with control point capabilities. The control point functionality provides mobility management to the system. The control point functionality executes a plurality of functions such as management of the radio link layer, the signaling protocol and data link layer over the wireless link.

According to one embodiment, when a user terminal 46 initially accesses a system, the user terminal 46 sends an initial access message to the network access point 40 corresponding to the coverage area in which it is located. The initial access message specifies a dummy identifier (DID) for the user terminal 46. The DID may be randomly selected from a fairly small set of numbers or, alternatively, can be determined using a hash function on a larger unique user terminal identification number. According to IS-95, the user terminal 46 uses the mobile station identifier (MSID) as the DID.

The originating network access point 40 perceives the initial access message and assigns an IP address to the user terminal 46. In one embodiment, a static set of IP addresses may be assigned to each network access point 40 and the network access point 40 selects one of the static set of IP addresses for assignment to the user terminal 46. In another embodiment, the system comprises a dynamic host central processor (DHCP) 48 which dynamically assigns IP addresses throughout the system. The DHCP 48 is used as the clearinghouse to assign available IP addresses.

The originating network access point 40 installs a route for the selected IP address to a controller within the originating network access point 40. For example, depending on the manner in which the IP address is selected, a static or dynamic route for the IP address is established according to well-known techniques. The network access point 40 informs the user terminal 46 of the selected IP address in a message, which designates both the DID and the IP address.

From this point forward in the communication protocol, the user terminal 46 uses the IP address as the MSID. For example, the user terminal 46 sends messages on the access, control, or traffic channels specifying the selected IP address.

In one embodiment, whenever a new or originating network access point 40 receives a message from the user terminal 46, the network access point 40 parses the message to determine the IP address. The network access point 40 creates an IP packet using the IP address as the address. The network access point 40 passes the packet to the packet router 42, which routes the packet according to the IP address. In this way, it is not necessary for a new network access point 40 to access a system-wide memory bank to determine the routing of an incoming packet. Instead, the network access points 40 rely solely on the information received in the packet. The system automatically forwards the IP packet to the appropriate network access controller using well-known techniques.

Figure 3:
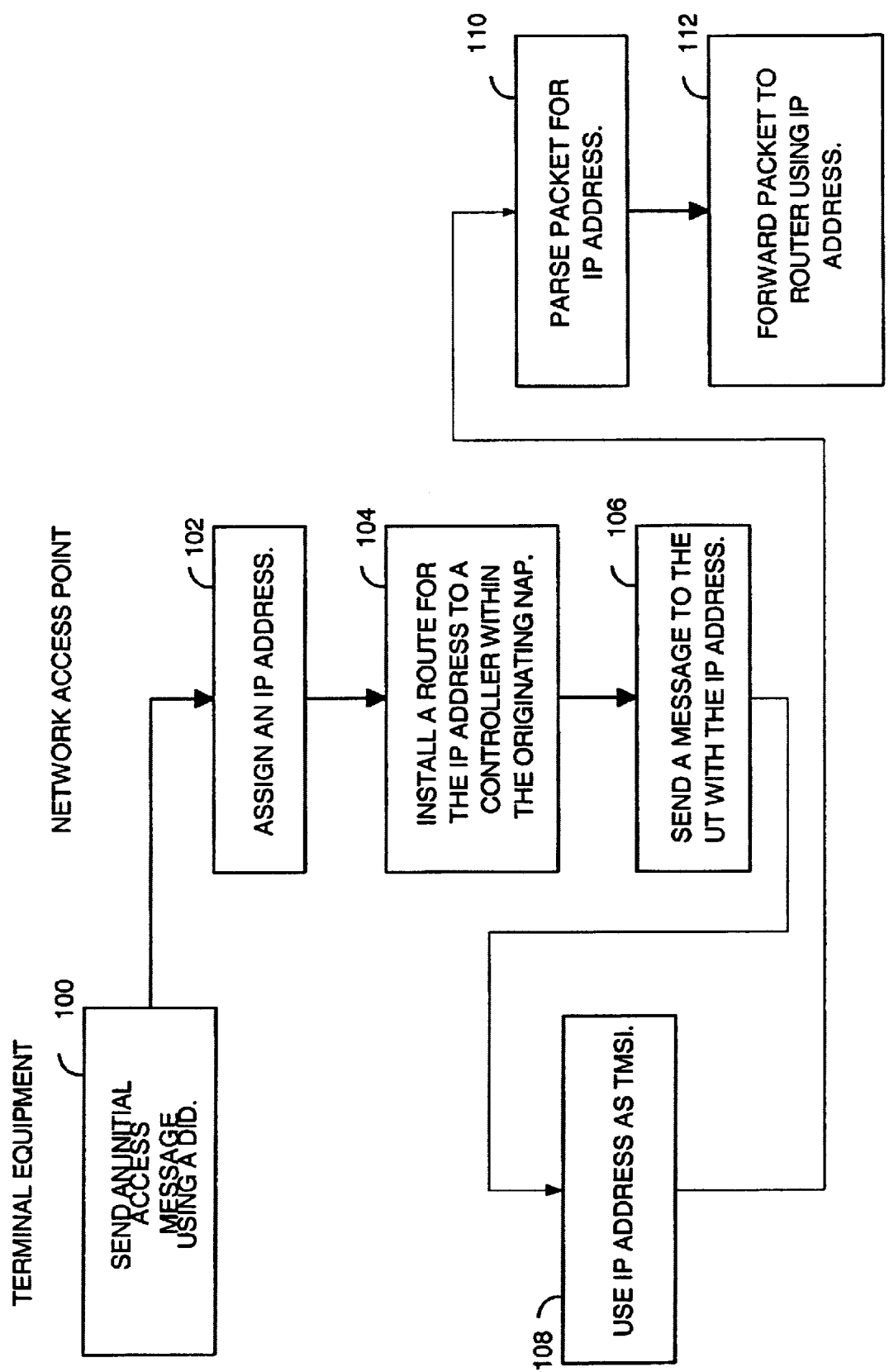
FIG. 3 is a flow chart showing exemplary operation of an embodiment of the invention.

FIG. 3 is a flow chart illustrating operation in accordance with one embodiment. In block 100, a user terminal sends an initial access message to a network access point specifying a dummy identifier. In block 102, an IP address is assigned to the user terminal for use during this session. Note that at this time, the network access point may not know the actual identity of the user terminal. In one embodiment, the IP address can be chosen by a dynamic host control processor. Alternatively, the network access point may select the IP address from a static pool. In block 104, a route is installed for the IP address according to wellknown principles. For example, a route is established which routes the IP address to a controller or control functionality within the original network access point. In general, a route is established to a controller configured to control the operation of the user terminal throughout the current session such as to provide control point functionality; and the controller may be located within a variety of system elements.

In block 106, the network access point sends a message to the user terminal using the dummy identifier as the MSID and specifying the designated IP address within the message. In block 108, the user terminal uses the IP address as a MSID and sends a message to the network access point. For example, in one embodiment, the message is a registration message. In another embodiment, the message carriers other overhead information or user data. In block 110, the network access point parses the message to determine the IP address. In block 112, the original network access point forwards a corresponding message to the router using the IP address as the source address.

In a similar manner, other entities coupled to the router can send messages to the user terminal using the IP address. The messages are routed to the original network access point which maintains identification information for the user terminal. For example, if a second network access point receives a message from the user terminal, the second network access point creates a corresponding message using the IP address as the destination address and forwards the message to the router. For example, referring also to FIG. 2, assume that steps 100, 102, 104, and 106 have been performed so that the user terminal 46 has been assigned an IP address and a corresponding route has been established to a controller assigned to the user terminal 46. Also assume that the network access point 40B is the originating network access point and that that controller is within the network access point 40B. Also assume that the current the user terminal 46 is within the coverage area of the network access point 40A. When the user terminal 46 creates a message, it creates a message identifying itself using the IP address. The message can be created according to the corresponding wireless link protocol. The message is forwarded to the network access point 40A such as over a wireless link path 60. The network access point 40A parses the message to determine the IP address. The network access point 40A creates a packet using the IP address as the destination address. The network access point 40A forwards the message to the packet router 42 such as over a standard IP path 62. The packet router 42 routes the packet to the controller within the network access point 40B such as over a standard IP path 64.

The above-described methods and apparatuses are particularly advantageous when used in conjunction with a system such as the QUALCOMM® HDR-2000 generally referred to as "QUALCOMM® High Data Rate Air Interface" and IS-95. In these systems, a 32-bit MSID is specified. Because the IP address is also 32 bits, the use of an IP address as a MSID is particularly advantageous in these embodiments.

The invention may be implemented in a variety of media including software and hardware. Typical embodiments of the invention comprise computer software which executes on a standard microprocessor, discrete logic, or an application specific integrated circuit (ASIC.)

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of providing wireless services comprising:

receiving a first wireless link message at a first network access point, the first wireless link message from a first user terminal, the first wireless link message identifying the first user terminal;

assigning an IP address to a controller within an access network, the IP address used for controlling operation of the first user terminal, the controller storing a current state of a communication session for the first user terminal;

assigning the IP address to the first user terminal for use as a mobile station identifier, the IP address being designated to a controller for controlling operation of the first user terminal throughout a communication session;

installing a route for the IP address to the controller;

forwarding a second wireless link message to the user terminal specifying the IP address;

receiving a third wireless link message from the first user terminal wherein the first user terminal is identified with the IP address, and routing the third wireless link message to the controller using the IP address.

2. The method of claim 1 further comprising parsing the third message to determine the IP address of the controller and creating at least one standard IP packet designating the IP address.

3. A system for providing wireless service comprising:

a packet router; and a first network access point corresponding to a first coverage area, the first network access point coupled to the packet router and comprising:

means to receive wireless link signals from a user terminal within the first coverage area;

means to establish a route within the packet router for an IP address, the IP address corresponding to control functionality within the first network access point;

means to assign the IP address as a Mobile Station Identifier for the user terminal; and means to receive messages from the user terminal Identified by the IP address as a Mobile Station Identifier (MSID), and route the messages to the network access point using the IP address.

4. The system of claim 3 further comprising a second network access point coupled to the packet router, the second network access point comprising:

means to receive wireless link messages from the user terminal within a second coverage area;

means to parse the wireless link message to determine the IP address; and means to create a standard IP packet designating the IP address and pass the standard IP packet to the packet router.

5. A system for providing wireless services comprising the steps of:

means for receiving a first wireless link message at a first network access point, the first wireless link message from a first user terminal, the first wireless link message identifying the first user terminal;

means for assigning an IP address to the first user terminal for use as a Mobile Station Identifier (MSID), the IP address being assigned to a controller at the first network access point, the controller for controlling operation of the first user terminal throughout a communication session, wherein the controller stores a current state of the communication session for the first user terminal;

means for installing a route for the IP address to a controller;

means for forwarding a second wireless link message to the user terminal specifying the IP address; and means for receiving a third wireless link message from the first user terminal wherein the first user terminal Is identified with the IP address as the MSID.

6. A network access point in a wireless communication system, the network access point adapted for communication with an Internet Protocol (IP) network, the network access point comprising:

a receiver adapted to receive a message from a user terminal and parse the message to determine an IP address of the user terminal, the IP address being used as a Mobile Station Identifier (MSID) and as a destination IP address of a controller of an originating access point for the user terminal;

controller for radio link layer management, signaling protocol management, and data link layer management over a wireless link;

means for creating an IP packet using the IP address as the address;

means for passing the packet to a packet router, which routes the packet according to the IP address.

* * * * *